United States Patent [19]

Costa et al.

[11] Patent Number: 4,692,266

[45] Date of Patent: Sep. 8, 1987

[54] SOLID SCINTILLATOR COUNTING COMPOSITIONS

[75] Inventors: Lorenzo F. Costa; David C. Harrington; Raymond S. Miller, all of Rochester, N.Y.

[73] Assignee: Eastman Kodak Company, Rochester, N.Y.

[21] Appl. No.: 766,232

[22] Filed: Aug. 16, 1985

[51] Int. Cl.$^4$ ............................................. C09K 11/06
[52] U.S. Cl. .......................... 252/301.17; 250/361 R; 250/364; 250/483.1; 250/486.1; 252/600; 427/157; 430/496
[58] Field of Search .......................... 252/301.17, 600; 427/157; 250/361 R, 486.1, 483.1, 364; 430/496

[56] References Cited

U.S. PATENT DOCUMENTS

| | | | |
|---|---|---|---|
| 3,150,101 | 9/1964 | Heimbuch | 252/301.2 |
| 3,356,616 | 12/1967 | Sandler et al. | 252/301.2 |
| 3,418,127 | 12/1968 | Millikan | 96/82 |
| 3,418,152 | 12/1968 | Staudenmayer et al. | 117/63 |
| 3,491,235 | 1/1970 | Millikan | 250/49.5 |
| 3,536,914 | 10/1970 | Chapman | 250/71.5 |
| 3,650,976 | 3/1972 | Luckey | 252/301.4 |
| 3,664,839 | 5/1972 | Jones | 96/82 |
| 3,712,827 | 1/1973 | Gramza | 117/33.5 |
| 3,758,412 | 9/1973 | Grum et al. | 252/301.2 |
| 3,896,138 | 7/1975 | Kreider | 252/301.2 |
| 4,127,499 | 11/1978 | Chen et al. | 252/301.17 |
| 4,275,300 | 6/1981 | Abbott | 252/301.17 |
| 4,396,528 | 8/1983 | Abbott | 252/301.17 |
| 4,562,158 | 12/1985 | Schellenberg | 436/57 |

FOREIGN PATENT DOCUMENTS

| | | |
|---|---|---|
| 827202 | 11/1969 | Canada . |
| 1241001 | 5/1967 | Fed. Rep. of Germany . |
| 901162 | 7/1962 | United Kingdom . |

OTHER PUBLICATIONS

Blair et al., Anal. Biochemistry 3 (1962), pp. 221–229.
Research Disclosure, vol. 160, Item No. 16061, Aug. 1977.
Journal of Chemical Education, "XLIX., Continuous Flow Measurement of Beta Radiation Using Suspended Scintillators," vol. 47, pp. A-9 through A-24, Jan. 1970.
Research Disclosure, vol. 161, Item No. 16110, Sep. 1977.

Primary Examiner—Arthur P. Demers
Attorney, Agent, or Firm—Dana M. Schmidt

[57] ABSTRACT

A dry solid scintillator counting composition for the detection of radiative substances in a liquid comprises a mixture of fluor particles and a binder bonding the particles into a coherent structure, the weight amount of the fluor being sufficiently greater than the weight amount of the binder to render the structure sufficiently porous between the disposed particles of fluor to provide transport of a saturating amount of liquid throughout at least 50% of the volume of the composition.

12 Claims, 4 Drawing Figures

SOLID SCINTILLATOR COUNTING COMPOSITIONS

FIELD OF THE INVENTION

The present invention relates to scintillator counting and more particularly to highly efficient dry scintillation counting compositions useful in dry counting elements.

DESCRIPTION OF THE PRIOR ART

Scintillation counters are used for measuring the density or concentration of emissions from radioactive emitters, such as beta particles, gamma radiation, etc. Such counters are well known in the art and the principles on which they operate are described, for example, in "Source Book on Atomic Energy" by Samuel Glasstone at pages 140-142, and "Two Liquid Scintillation Neutron Detectors," by Muelhouse and Thomas, *Nucleonics* 11, 44 (1953). Briefly, these counters detect and quantify emissions from scintillator compositions which comprise a solvent (liquid or solid) which "captures" the incoming radiation to be detected and measured, a primary fluor which responds to the incoming, "captured" radiation by fluorescing at a specified wavelength, and if desired, a secondary fluor or wave shifter which responds to the emissions of the primary fluor by fluorescing at a specified second wavelength. Additional wave shifters can also be present.

There are three types of scintillator compositions. These are: (1) solid scintillators comprising crystals of a solid hydrocarbon material, usually dispersed in a binder; (2) liquid scintillators which comprise one or more suitable solid scintillators dissolved in a liquid solvent; and (3) solid solution scintillators which comprise a solid scintillator in solution with a solid polymer. The compositions of this invention are most closely related to solid scintillators.

Liquid scintillation counting compositions are capable of efficiencies above 35% and in some cases, 100% of theoretical, most probably due to the intimate emitter-fluor contact possible in a liquid medium. The utility limitations of solid scintillator compositions are apparently due in large part to an inability to achieve intimate contact between the emitter and fluor. Such intimate contact is particularly important when weak, short range radiations are to be detected by the fluor, for example, sample systems of weak $\beta$-emitters such as tritium and $^{14}C$ or $\gamma$-emitters such as $^{125}I$.

Solid scintillators have been provided prior to this invention comprising a dried composition of a fluor and a binder, usually on a support. Such compositions included non-ionic fluors dispersed in an aqueous soluble or swellable binder, as disclosed for example in U.S. Pat. No. 3,491,235 and such fluors loaded into polymeric particles derived from a latex as described in *Research Disclosure*, Vol. 160, Publication No. 16061, August, 1977, published by Emsworth Studios, Inc., 260 West 39 Street, New York, N.Y. 10018. The last-noted counting composition is particularly adapted to provide high counting efficiencies for low-energy radioactive sources contained in liquids which swell the polymeric particles of the composition.

Although such previous compositions have increased the efficiencies heretofore available, they have been limited as true scintillation counters to the use of test samples contained in liquids that swell, partially dissolve, or diffuse through the binder or polymeric particles. For example, if the binder is gelatin or is a water-swellable latex, then the radioactive sample is preferably contained in water for testing. Such a relationship has been necessitated by the fact that the fluor is essentially buried in or completely covered by the binder of the composition. Intimate contact between the radioactive sample and the fluor is achieved by swelling, dissolving or diffusing through the binder. Thus counting efficiencies of prior art solid scintillator counting compositions especially for weak, short range radiations are generally low so that the primary scintillating results depend on the diffusibility and molecular size of the sample. Only low molecular weight material can be tagged and studied by such a solid scintillator counting composition, that is, only those materials having molecular weights not exceeding about 200. Such a relationship also necessarily limits the nature of the binder and the sample liquid that can be used.

Furthermore, if the fluor is buried, the ratio of fluor to binder is limited. The aforementioned *Research Disclosure* 16061 teaches that the fluor can constitute as much as 25 percent of the weight of the dry solids content of the composition. In Example VII in U.S. Pat. No. 3,491,235 the fluor constitutes 50 percent by weight of the dry solids content of the composition.

What has been desired is a highly efficient dry scintillation counting composition that can be used to test a liquid sample using a wide range of solvents as the liquid or a wide range of binders, that is less dependent than prior art compositions on the molecular size of the test samples or diffusibility of the samples into the dried composition coating, and that is easily and economically prepared.

SUMMARY OF THE INVENTION

In accordance with the present invention there are provided novel dry particulate scintillator counting compositions, scintillation counting elements, and methods for detecting and quantitatively determining low energy radioactivity in liquid samples for analysis, as well as high-energy radioactivity.

More specifically, there is provided a particulate scintillator counting composition for the detection of radiative substances in a liquid, comprising a mixture of fluor particles and a binder bonding said particles into a coherent structure, the weight amount of said fluor being sufficiently greater than the weight amount of said binder as to generally render said structure sufficiently porous between the disposed particles of fluor to provide transport of a saturating amount of liquid throughout at least 50% of the volume of the composition.

A further embodiment of the invention comprises a dry element for the detection of radiative substances in a liquid comprising a support and a layer on the support comprising a scintillator composition of the invention.

Still another embodiment of the invention provides a method of detecting radiative substances in a liquid comprising the steps of applying the liquid to a dry scintillator counting composition of the invention and counting the emissions of the fluor caused by the radiative substance.

Thus, it is an advantageous feature of the invention that the composition utilizes fluor to binder weight ratios exceeding 1:1, up to weight or volume ratios of 20:1 and higher.

It is a related advantageous feature of the invention that such a composition has a high counting efficiency, even for liquids which do not swell, dissolve, or penetrate the binder.

A further advantageous feature of the invention is that the counting compositions more readily accommodate high molecular weight samples than solid solution counting compositions of the prior art which require the binder to swell

DETAILED DESCRIPTION OF THE INVENTION

Figure 1:
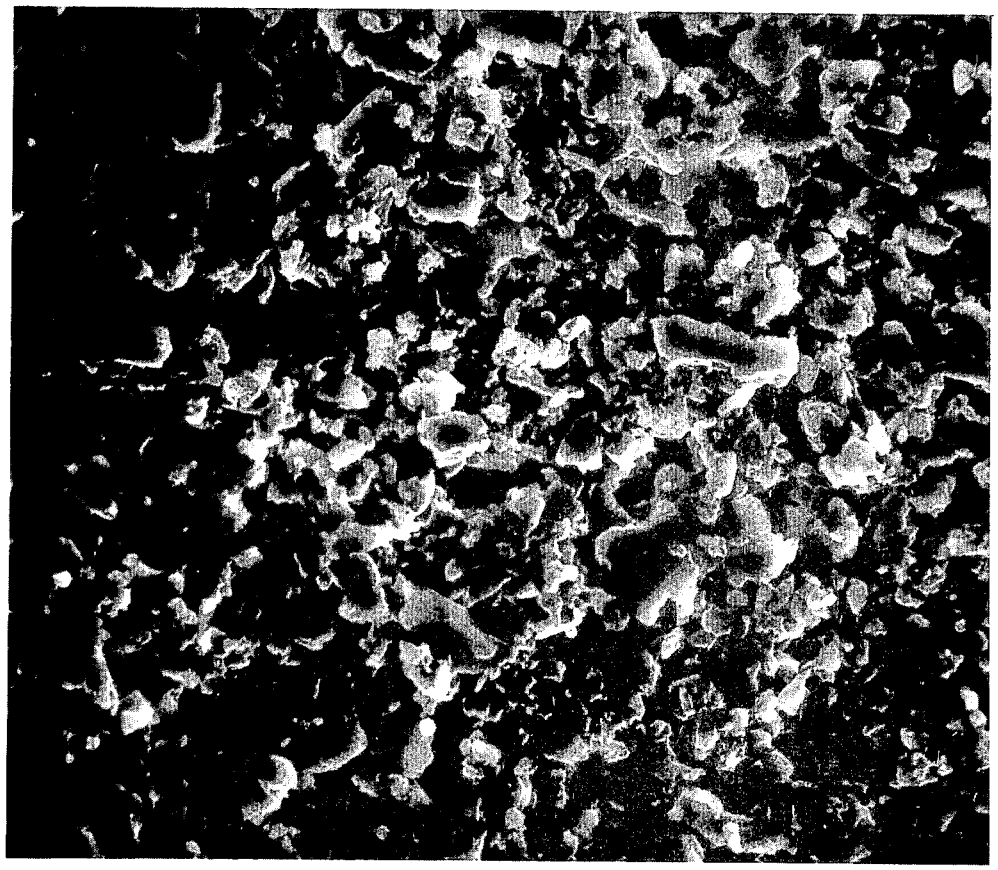
FIGS. 1-2 are black and white photomicrographs obtained under 300× and 1000× magnification showing the particulate coherent porous structure formed by the fluor particles and binder in accordance with the invention.

The particulate scintillator counting compositions of this invention comprise a mixture of fluor particles, preferably in the form of microcrystals, and a binder bonding the particles into a coherent but porous structure. The weight amount of the fluor is sufficiently greater than the weight amount of the binder as to render the structure sufficiently porous between the disposed fluor particles to provide for transport of liquid through at least 50% of the volume of the composition, where the amount of liquid applied to the composition is an amount that is at least a saturating amount, i.e., equal to that required to saturate the volume of the composition.

Such determination of the transport of the liquid is facilitated by dyeing the liquid sample, and viewing a cross-section of the composition under a microscope. It has been found that a randomly-selected cross-sectional area of the coated composition is fairly representative of the volume, so that transport of the liquid through 50% of such area indicates transport through 50% of the volume.

Most preferably the fluor to binder volume ratios exceed 2:1. Because volume ratios are more difficult to measure, and the preferred fluors and binders have approximately equal densities, hereinafter this ratio is expressed as a weight ratio. It will be understood, however, that the use of fluors and binders of drastically different densities will require the ratio to be measured in terms of the volume, to see if this 2:1 ratio requirement is met.

The resulting structures of the particulate scintillator counting compositions of this invention are sufficiently porous so that liquid deposited onto the composition permeates into the pores, bringing the liquid and emitters contained therein into intimate contact with the particulate matter, preferably to be adsorbed on the surfaces of the fluor particles, thereby providing a high relative counting efficiency. Certain elements of the invention exhibit counting efficiencies for the tritium ($^3H$) isotope as good as or better than liquid scintillation cocktails and exhibit excellent counting efficiencies for $^{14}C$ and $^{125}I$ isotopes as illustrated by the Examples set forth herein.

An essential feature of the invention is the coherent porous structure of the dry scintillator counting composition. The coherent porous structure is essential to provide for the afore-described transport of liquid and for substances which may be contained in the liquid. Transport of liquid through prior art compositions requires the liquid to swell, partially dissolve, or diffuse through the binder. In contrast, transport of liquid occurs when using the composition of this invention, without requiring that the liquid necessarily swell, dissolve or diffuse through the binder.

Fluors useful in the successful practice of the invention include any of the fluors well known in the scintillation counting art which are substantially insoluble in the solvent of the sample.

Fluors having an ionic character, substantially insoluble in nonpolar organic solvents, which are useful herein include:

certain pyrylium salts, especially the 2-aryl-4-secaminobenzo[b]pyrylium salts described in U.S. Defensive Publication T896,044, exemplified by
  4-(n-butylamino)-2-(4-methoxyphenyl)benzo[b]pyrylium perchlorate (hereinafter pyrylium I),
  4-(n-butylamino)-2-(4-methoxyphenyl)benzo[b]pyrylium fluoroborate,
  4-(n-butylamino)-2-(2,4-dimethoxyphenyl)benzo[b]pyrylium perchlorate,
  4-benzylamino-2-(4-methoxyphenyl)naphtho[2,1-b]pyrylium perchlorate;
other fluorescent pyrylium salts such as
  2,6-bis(p-ethylphenyl)-4-(p-n-amyloxyphenyl)thiapyrylium perchlorate,
  2,6-dianisyl-4-phenylpyrylium perchlorate,
  2,4,6-triphenylpyrylium perchlorate,
  2-anisyl-4,6-diphenylpyrylium perchlorate;
salts of salicylic acid, such as
  lithium salicylate
  tetramethylguanidinium salicylate
  o-toluidinium salicylate
  sodium salicylate;
xanthene dyes, such as
  o-(6-amino-3-imino-3H-xanthen-9-yl)benzoic acid hydrochloride,
  o-[6-(ethylamino)-3-(ethylimino)-2,7-dimethyl-3H-xanthen-9-yl]benzoic acid perchlorate,
  ethyl o-[6-(ethylamino)-3-(ethylimino)-2,7-dimethyl-3H-xanthen-9-yl]benzoate chloride,
  [9(o-carboxyphenyl)-6-(diethylamino)-3H-xanthen-3-ylidene]diethylammonium chloride,
  N-[6-(diethylamino)-9-[2-(ethoxycarbonyl)phenyl]-3H-xanthen-3-ylidene]-N-ethylethanaminium perchlorate, and
  8-(2,4-disulfophenyl)-2,3,5,6,11,12,14,15,-1H, 4H, 10H, 13H-octahydrodiquinolizino [9,9a,1-bc; 9,9a, 1-hi]xanthylium hydroxide inner salt;
oxazine dyes, including:
  9-ethylamino-5-ethylimino-10-methyl-5H-benzo(a)phenoxazinium perchlorate,
  3,7-bis(ethylamino)-2,8-dimethylphenoxazinium perchlorate,
  3,7-bis(diethylamino)phenoxazinium perchlorate, and
  5-amino-9-diethylaminobenzo[a]phenoxazinium perchlorate; and Other ionic silver halide sensitizing dyes, such as those ionic sensitizing dyes described in *Research Disclosure*, December 1978, part IVA such as carbon-bridged dyes and cyanine dyes such as 1,1',3,3,3'-hexamethylindodicarbocyanine iodide, cryptocyanine,
3,3'-diethyloxatricarbocyanine iodide,
1,1',3,3,3'-hexamethyl-4,4',5,5'-dibenzo-2,2+-indotricarbocyanine perchlorate,
1,1',3,3,3'-hexamethylindotricarbocyanine perchlorate,
1,1',3,3,3'-hexamethylindotricarbocyanine iodide
3,3'-diethylthiatricarbocyanine iodide, and
3,3'-diethylthiatricarbocyanine perchloriate are also useful in the practice of this invention.

Fluors having a non-ionic character, substantially insoluble in aqueous liquids useful herein may be selected, for example, from those described as "organic fluors" and "organic scintillators" in Organic Scintillation Detection, E. Schram and R. Lombaert, Elsvier Publishing Co., 1963. Materials of this type include as the primary fluor the following: anthracene, p-terphenyl, p-quaterphenyl, m-terphenyl, trans-stilbene, phenanthrene, indene, 9,10-diphenylanthracene, 2-phenyl-5-(4-biphenylyl)-1,3,4-oxadiazole, 2,5-diphenyloxazole, 1,1,4,4-tetraphenyl-1,3-butadiene, naphthalene, 2,5-di-(4-biphenylyl)oxazole, 2-(1-naphthyl)-5-phenyloxazole, and 1,3,5-triaryl-2-pyrazolines including 1,3,5-triphenyl-2-pyrazoline, 1,3-diphenyl-5-p-acetoamidophenyl-2-pyrazoline, 1,3-diphenyl-5-p-hydroxyphenyl-2-pyrazoline, 1,5-diphenyl-2-p-methoxyphenyl-2-pyrazoline, 1-phenyl-3,5-di-p-methoxyphenyl-2-pyrazoline, 1,3-diphenyl-5-p-methoxyphenyl-2-pyrazoline, 1,3-diphenyl-5-p-diphenyl-2-pyrazoline, and compatible mixtures of any of the preceding.

Secondary fluors, useful as wavelength shifters herein, are conventional compounds known as such in the art including:

1,1,4,4-tetraphenyl-1,3-butadiene,
p-bis(o-methylstyryl)benzene,
1,4-bis-2-(4-methyl-5-phenyloxazolyl)benzene,
2,2'-p-phenylenebis(5-phenoxazole),
diphenylstilbene,
the previously identified 1,3,5-triaryl-2-pyrazolines,
4-(n-butylamino)-2-(4-methoxyphenyl)benzo[b]pyrylium perchlorate,
sodium salicylate,
1,4-bis(2-methylstyryl)benzene,
7-dimethylamino-4-methyl-2-quinoline,
7-amino-4-methylcoumarin,
4,6-dimethyl-7-ethylamino coumarin, and
2,5-diphenyloxazole.

Certain of these secondary fluors are useful as primary fluors and certain of the above-identified primary fluors are useful as secondary fluors.

Most preferred for use herein are p-quaterphenyl as the primary fluor and 7-dimethylamino-4-methyl-2-quinolinone, 1,4-bis(2-methylstyryl)benzene, 7-amino-4-methylcoumarin, and 4,6-dimethyl-7-ethylaminocoumarin as the secondary fluor. The concentration of the fluor required to provide a useful dispersion, coated element or solid scintillator composition will vary depending on the sensitivity of the particular fluor used as well as the type of particles to be measured with a particular fluor composition. The concentration of primary fluor preferably ranges from about 50 to about 95 weight percent and the concentration of the secondary fluor from about 0.001 to about 0.25 weight percent measured on dry solids weight basis, in order to achieve useful results. Relatively higher concentration levels of fluor than those available in prior art solid scintillators used for the detection of radiative substances in a liquid are obtainable in accordance with the teaching of the present invention.

The fluor particles preferably range in size from $5 \times 10^{-9}$m to $2 \times 10^{-4}$m. Fluor particles ranging in size from $1 \times 10^{-6}$m to $1 \times 10^{-4}$m are most preferred. The fluor particles must be luminescent in the solid state and substantially insoluble in at least one solvent used in scintillation counting. The fluor particles generally are produced by grinding and/or ball milling larger grains prepared by methods known in the art.

The compositions and elements of the present invention advantageously are prepared from a coating dispersion. The coating dispersions useful in the practice of the invention are generally prepared by ball milling the fluor in a compatible solvent. A 10:1 to 0.1:1 weight ratio of fluor to solvent is preferred. After ball milling to an appropriate fluor particle size, about 5 to about 50 weight percent of the binder to be used is added and ball milling continues until a uniform dispersion is obtained. A "compatible solvent" as the term is used herein includes those solvents in which a particular fluor is substantially insoluble or solvents which with the fluor forms a coatable dispersion. Compatible solvents useful in preparing the fluor dispersions include for non-ionic fluors, water and other polar solvents; such as methanol, ethanol, propanol, butanol, and the like; and for ionic fluors, nonpolar organic solvents such as cyclohexane, tetrahydrofuran, cyclohexanone, benzene, toluene, xylene, hexane, heptane, and the like, and alkyl or aryl ethers.

The dry composition of the invention must contain a binder which binds the fluor particles into a coherent structure that is porous, as well as to the support. In addition to rendering the fluor particles cohesive, the binder preferably is substantially non-attenuating and non-quenching, i.e., it should not absorb to any significant extent incoming emissions or act in any inhibiting fashion with respect to the emissions of the fluor once excited.

Generally, any of the binders known to be useful in prior art solid scintillators may be used herein provided the binder possesses the properties specified above. The adhesives described generally in U.S. Pat. No. 4,258,001 are useful herein. Preferred binders include gelatin; starches; poly(vinyl alcohol); poly(acrylamide); poly(isobutyl methacrylate) (e.g., Elvacite 2045 sold by DuPont); poly(methyl methacrylate-co-methacrylic acid); Butvar B-98, a poly(vinyl butyral) sold by Shawinigen Co.; RP-1714 Gelva Multipolymer Solution, an acrylic copolymer of vinyl acetate sold by Monsanto Co.; SR-82, a silicon resin sold by General Electric Co.; and combinations of two or more of the above binders in various proportions.

As noted, an advantageous aspect of this invention is that it is not essential for the liquid sample containing the radiative substances to swell, dissolve, or diffuse through the binder to effect high counting efficiencies. Especially good results have been obtained using the RP-1714 Gelva Multipolymer Solution or Elvacite 2045 polymer as a binder.

According to a preferred embodiment of the invention, a coating dispersion such as described above is coated on a suitable support by conventional means and the solvent is driven off to provide a substantially dried scintillation counting element. The support can be omitted if the coating is self-supporting. If a support is to be used, it can be a conventional photographic support. Useful supports include transparent supports, such as film supports and glass supports, as well as opaque supports, such as metal and photographic paper supports. Useful supports are described in *Research Disclosure,* 17643, December 1978 section XVII. Preferred supports are flexible and transparent to radiation in the 320–700 nm range, such as poly(ethylene terephthalate) or cellulose acetate.

Preferably the wet thickness of the coating is from $1 \times 10^{-5}$ m to $2 \times 10^{-4}$ m. A fluor coverage of about 0.001 to 0.1 grams/cm$^2$ of support material is preferred. The coating is dried by conventional means resulting in a dry counting element. "Dry" as used herein refers to a state in which most, but not necessarily all of the water or other solvent has been removed by evaportion or otherwise. After drying, optionally, and in a highly preferred embodiment, a dispersion of a secondary fluor in a compatible solvent is overcoated and dried. Useful coating and drying techniques are described in *Research Disclosure,* 17643 December 1978 under section XV.

Optionally, dispersing agents, coating aids, surfactants and the like can be added to the dispersion to facilitate preparation of the dried coating and to enhance its operability.

The dried compositions and elements of the invention optionally, in a preferred embodiment, can be contacted with a surfactant or exposed to a corona discharge treatment to improve counting efficiencies. Such improvements are particularly noted for coatings of relatively greater thickness and/or greater hydrophobicity. Surfactants useful herein include:

Alkanol XC, a sodium alkyl naphthalene sulfonate sold by duPont Co.,

Surfactant 10 G, a nonylphenoxypolyglycidol sold by Olin Chemical Co.,

Triton$^R$ X-100, an octylphenoxy polyethoxy ethanol sold by Rohm and Haas Co.,

Triton$^R$ X-200, the sodium salt of an alkylaryl polyether sulfonate sold by Rohm and Haas Co.

Especially good results have been obtained using this latter surfactant.

It has been found that, upon drying the instant coated composition, the binder withdraws from the exposed surfaces of the fluor crystals and is confined only to the points of contact with adjacent crystals. It is this mechanism that appears to provide the high degree of porosity characteristic of this composition.

In use, a liquid radioactive sample is applied to the scintillator composition or element of the invention. Such liquid sample can be delivered in any suitable manner, such as by depositing the test sample on the surface of the composition. After permitting the transport of the liquid into the pores of the scintillation counting composition, the coating then is positioned in a scintillation counter of conventional design, such as a Packard Tri-Carb Liquid Scintillation Counter, to detect the amount of fluorescent pulses which correspond to the concentration of the test sample.

An alternative use of the coating is to deposit the test sample on two approximately identical coatings, and then place the coatings together face to face before positioning them in the counter. The advantage is that radioactive particles are more likely to strike fluors in this configuration.

Preferably, the liquid sample does not dissolve the fluor to any significant degree. Thus, non-polar organic solvents such as toluene, p-xylene, p-dioxane, 2-butoxyethanol, cyclohexane, hexane, pentane, and other hydrocarbon solvents preferably are used with ionic fluors, and aqueous solvents such as water, and aqueous solutions of benzoic acid, methanol, acetone and other water soluble organic solvents preferably are used with non-ionic fluors. As previously noted, a particularly advantageous aspect of the present invention is that a wide range of solvents for the liquid sample and a wide range of binders may be selected in preparing compositions of the invention compared to prior art solid scintillator compositions. As is shown in the following examples, with the preferred scintillator compositions one can use either polar solvents like water and methanol for example, or non-polar solvents like N-hexane, etc.

Liquid deposited onto the scintillation composition permeates into the pores, thereby bringing the radiative substances into intimate contact with the particulate fluors. Then, upon drying, the radioactive substance is left in the film, apparently adsorbed to the fluor surfaces. Thus it is possible to have a counting efficiency which is high enough to detect low energy emissions. The effectiveness of the invention has been found to be so great that the composition of the invention is useful also in assaying relatively high molecular weight compounds, e.g., myosin, methoxyinulin and dextran.

When the invention is carried out as described, and a saturating amount of a dyed sample is applied thereto, microscopic viewing of a cross-section of the composition reveals that the sample has easily penetrated at least 50% of the volume of the composition. In fact, very little of the particulate volume of the fluors is left undyed by the sample, indicating that intimate contact has occurred between the fluors and sample emitters, as required.

The practice of the invention is further illustrated by the following examples.

The Compositions of the Drawings

Figure 2:
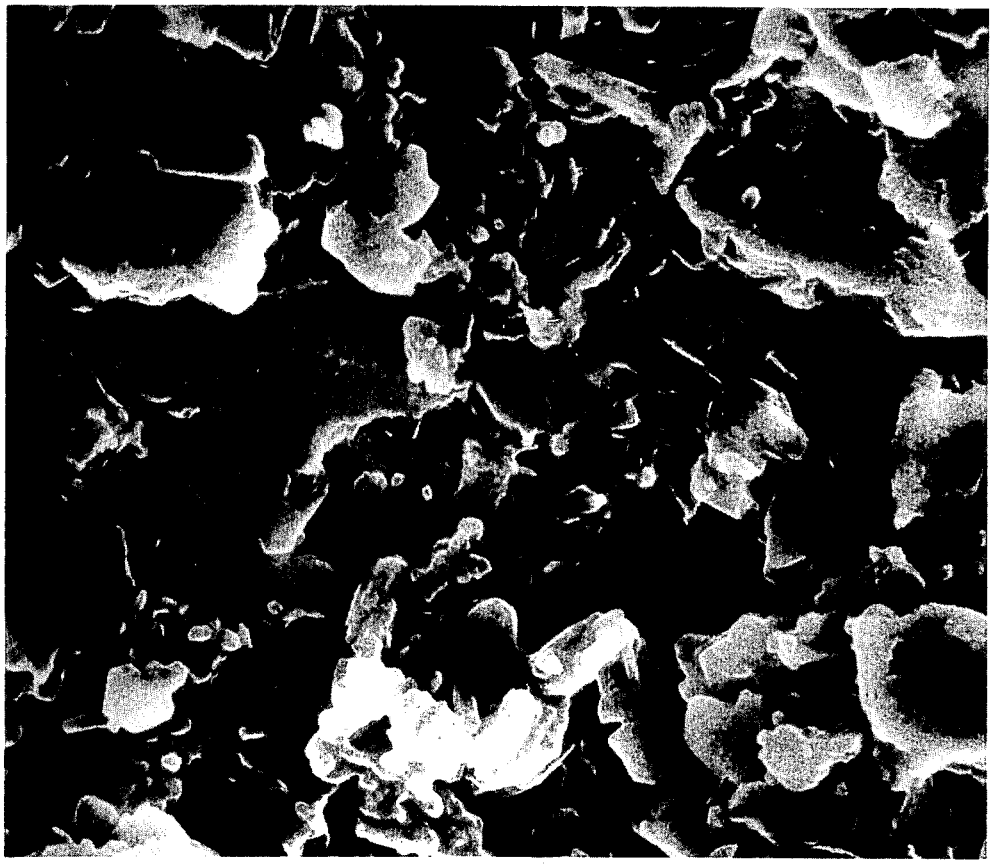
Figure 4:
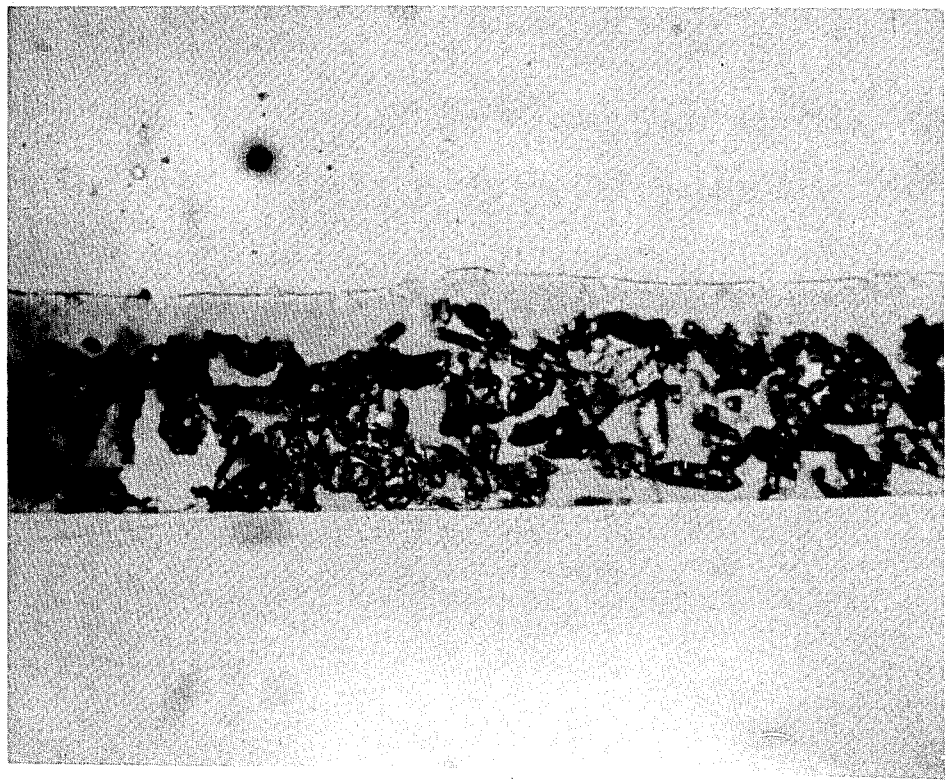
FIG. 4 is a color photomicrograph obtained under 500× magnification showing a 6:1 fluor to binder weight ratio composition of the invention impregnated with a dye. The photomicrograph shows dye permeation throughout the entire layer. A binder surface boundary layer is not evident.

The composition that appears in FIGS. 1–2, as well as the composition that appears in FIG. 4, were prepared as follows: 2 g of p-quaterphenyl and 2.4 ml of methanol were added to a small jar along with steel balls, and ball milled for 30 minutes. Thereafter, 0.64 g. of a 50% by weight solution of vinyl acetate copolymer (RP-1714 Gelva Multipolymer Solution) binder was added and ball milling continued for an additional 30 minutes. The solution was coated with a hand-coating knife onto subbed poly(ethylene terephthalate) at a wet thickness of about 152 μm, and dried. The resulting ratio of fluor to binder was 2/0.5×0.64, or 6.25 to 1.

Figure 3:
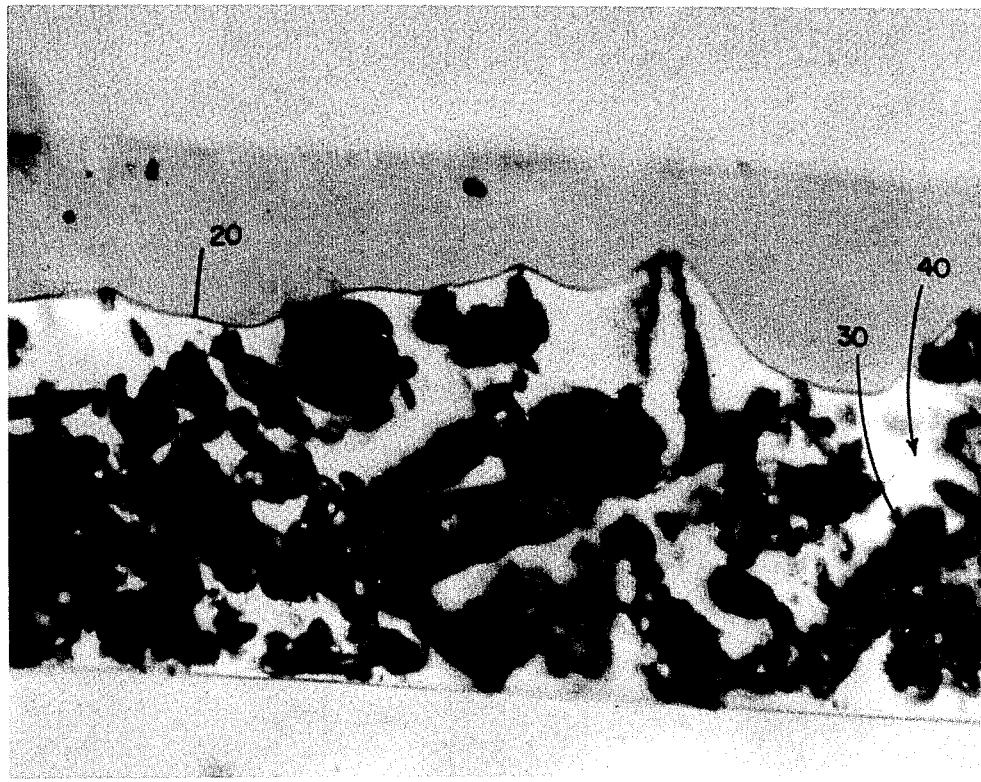
FIG. 3 is a photomicrograph obtained under 1000× magnification showing a 1:1 fluor to binder weight ratio composition of the prior art impregnated with a dye. The photomicrograph shows a binder surface boundary layer and no dye penetration.

In contrast, the coating that appears in FIG. 3 was identically prepared, except that the amount of quaterphenyl was 3 g, and the amount of the binder solution was raised to 6 g, so that the fluor-to-binder ratio was 3/0.5×6, or 1:1.

Transport of liquid was determined in these compositions by the dyed liquid method described above. The test comprised the addition of one drop of dyed Polaroid Coater Fluid sold by Polaroid Corp. (to stabilize prints when applied after development) having a pale pink color, to a composition prepared as noted below. The embodimen t of FIG. 4 was tested identically as that of FIG. 3. In the case of FIG. 3, transport of a saturating amount of liquid did not occur throughout at least 50% of the volume of the composition, but stopped at boundary 20, short of the fluors 30 embedded in the binder 40. In the case of FIG. 4, transport of a saturating amount of liquid did occur throughout much more than 50% of the volume of the composition of the invention, as shown by the colored area. The clear area represents binder in FIG. 4.

EXAMPLES 1-2

A mixture of 6 gm of scintillation grade p-quaterphenyl and 7.2 gm methanol was ball milled with 40 gm of steel balls for 30 minutes. A solution of 1.92 gm of a vinyl acetate copolymer (RP-1714 Gelva Multipolymer Solution sold by Monsanto Co., hereinafter "RP-1714") binder dissolved in 7.44 gm methanol was added to the above mixture. Milling was continued for 30 minutes.

This dispersion was coated onto a subbed poly(ethylene terephthalate) film support with a hand coating knife at a wet thickness of about 0.076 mm and evaporated to dryness. The maximum particle size of the coated p-quaterphenyl crystals was about 2 μm. For the two examples, two strips 5 cm by about 1.3 cm were cut and treated with 10 μL $^3$H-estradiol in a pH 8.7 buffer (aqueous 0.2M glycine acetate, 1% gelatine) and 10 μL $^{14}$C—methoxyinulin in the same buffer solution. Each solution when spotted had respectively 32,197 and 21,566 disintegrations/minute. The strips were mounted in glass counting vials, and counted in a Packard Tri-Carb Liquid Scintillator Counter Model 3380/544 at 12° C. The absolute counting efficiency was determined by comparing the detected emission against the theoretical disintegrations per minute.

The relative counting efficiency of the sample was determined by the counts per minute found on the solid scintillator divided by counts per minute found for the same sample in 10 ml Eastman Liquid Scintillator Cocktail Ready to Use II. Eastman "Ready to Use II" Cocktail is a ready made scintillation cocktail available from Eastman Kodak Company used for aqueous samples in liquid scintillation counting, having absolute counting efficiencies of about 35% for $^3$H and 78% for $^{14}$C. The results appear in Table 1.

TABLE 1

| Example | Sample Isotope | Counting Efficiency % Relative | Absolute |
|---|---|---|---|
| 1 | $^3$H | 97.1 | 35.2 |
| 2 | $^{14}$C | 68.9 | 57.6 |

The counter was constructed to accommodate liquid samples in a glass vial. Higher readings would be obtained in counting apparatus designed for use with thin film samples. Further, the energy setting of the peak-discriminator of the detector was chosen to give the maximum signal with liquid scintillation samples. Higher readings would be obtained if the solid samples were measured with the peak-discriminator setting optimized for the solid samples.

EXAMPLES 3-11

To determine the effect of the thickness of the wet coating, the procedure followed in Examples 1 and 2 was repeated except that 3 coatings were prepared having wet thicknesses of about 0.076, 0.152 and 0.229 mm. The average dry thicknesses are about 20% of the nominal wet thicknesses listed here. Test samples included $^3$Hestradiol in H$_2$O, $^{14}$C-methoxyinulin in H$_2$O and in $^{125}$Ithyroxine in H$_2$O. Each solution when spotted had respectively 32,422, 21,257, and 9,366 disintegrations/second. The results appearing in Table 2 indicate that the counting efficiency decreased for $^3$H, increased for $^{14}$C* and remained about the same for $^{125}$I as the coating thickness increased.

* This increase for $^{14}$C is more likely to be noticed if a surfactant is incorporated into the composition.

TABLE 2

| Example | Coating Thickness (mm) | Sample Isotope | Counting Efficiency % Relative | Absolute |
|---|---|---|---|---|
| 3 | .076 | $^3$H | 93.2 | 32.1 |
| 4 | .076 | $^{14}$C | 69.3 | 53.6 |
| 5 | .076 | $^{125}$I | 53.5 | 23.9 |
| 6 | .152 | $^3$H | 87.1 | 30.0 |
| 7 | .152 | $^{14}$C | 81.8 | 63.2 |
| 8 | .152 | $^{125}$I | 51.6 | 23.1 |
| 9 | .229 | $^3$H | 80.5 | 27.7 |
| 10 | .229 | $^{14}$C | 91.3 | 70.6 |
| 11 | .229 | $^{125}$I | 51.2 | 22.9 |

EXAMPLES 12-23

To illustrate the effect of secondary fluor doping, dried coatings prepared as in Example 1-2 were overcoated with cyclohexane (control), and dispersions of 1,4-bis(2-methylstyryl)benzene (hereinafter "Bis MSB") in cyclohexane; 7-dimethylamino-4-methyl-2quinoline (hereinafter "Carbostyryl 165") in cyclohexane; 7-amino-4-methyl coumarin (hereinafter "Coumarin 120") in cyclohexane; and 4,6-dimethyl-7-ethylaminocoumarin (hereinafter "Coumarin 2") in cyclohexane; and evaporated to dryness.

Strips of the dried coatings were treated with $^3$H, $^{14}$C, and $^{125}$I and counted in accordance with the procedure outlined in Examples 1-2. The results appear in Table 3.

TABLE 3

| Example | Secondary Fluor | Sample Isotope | Counting Efficiency % Relative | Absolute |
|---|---|---|---|---|
| 1' | None | $^3$H | 91.5 | 32.0 |
| 2' | None | $^{14}$C | 64.1 | 50.7 |
| 3' | None | $^{125}$I | 62.1 | 28.7 |
| 12 | Bis MSB | $^3$H | 87.4 | 30.6 |
| 13 | Bis MSB | $^{14}$C | 63.3 | 50.0 |
| 14 | Bis MSB | $^{125}$I | 62.4 | 28.8 |
| 15 | Carbostyryl 165 | $^3$H | 93.6 | 32.7 |
| 16 | Carbostyryl 165 | $^{14}$C | 67.6 | 53.4 |
| 17 | Carbostyryl 165 | $^{125}$I | 59.1 | 27.3 |
| 18 | Coumarin 120 | $^3$H | 94.4 | 33.0 |
| 19 | Coumarin 120 | $^{14}$C | 57.3 | 45.2 |
| 20 | Coumarin 120 | $^{125}$I | 61.6 | 28.4 |
| 21 | Coumarin 2 | $^3$H | 86.5 | 30.3 |
| 22 | Coumarin 2 | $^{14}$C | 59.4 | 46.9 |
| 23 | Coumarin 2 | $^{125}$I | 65.5 | 30.2 |

To illustrate the effect of peak-discriminator optimization, the same samples were measured again but with the discriminator optimized for best signal on the solid samples (Table 4). For the reference measurements on liquid samples the discriminator remained optimized for liquids. The results are given in Table 4.

TABLE 4

| Example | Secondary Fluor | Sample Isotope | Counting Efficiency % Relative | Absolute |
|---|---|---|---|---|
| 1' | None | $^3$H | 114.8 | 40.2 |
| 2' | None | $^{14}$C | 82.9 | 65.5 |
| 5' | None | $^{125}$I | 61.7 | 28.5 |
| 12 | Bis MSB | $^3$H | 111.0 | 38.8 |
| 13 | Bis MSB | $^{14}$C | 74.8 | 59.0 |

TABLE 4-continued

| Example | Secondary Fluor | Sample Isotope | Counting Efficiency % Relative | Absolute |
|---|---|---|---|---|
| 14 | Bis MSB | $^{125}I$ | 69.6 | 32.1 |
| 15 | Carbostyryl 165 | $^3H$ | 120.6 | 42.2 |
| 16 | Carbostyryl 165 | $^{14}C$ | 86.9 | 68.6 |
| 17 | Carbostyryl 165 | $^{125}I$ | 64.5 | 29.8 |
| 18 | Coumarin 120 | $^3H$ | 119.8 | 41.9 |
| 19 | Coumarin 120 | $^{14}C$ | 76.6 | 60.5 |
| 20 | Coumarin 120 | $^{125}I$ | 65.2 | 30.1 |
| 21 | Coumarin 2 | $^3H$ | 111.6 | 39.0 |
| 22 | Coumarin 2 | $^{14}C$ | 74.8 | 59.1 |
| 23 | Coumarin 2 | $^{125}I$ | 59.4 | 31.3 |

EXAMPLES 24-31

To illustrate the effect of the binder, the procedures in Examples 1 and 2 were repeated except that the RP-1714 binder was replaced by cellulose nitrate, Butvar B-98, a poly(vinyl butyral) sold by Shawinigan Co. (hereinafter "Butvar B-98"), SR-82, a silicon resin sold by General Electric Co., (hereinafter "SR-82"), and Arotap, a modified nonoxidizing acrylic polymer sold by Ashland Chemical Co. (hereinafter "Arotap"). The results set forth in Table 5 below indicate each of these binders is useful in the practice of the invention but optimal results are obtained with the RP-1714 binder.

TABLE 5

| Example | Binder | Sample Isotope | Counting Efficiency % Relative | Absolute |
|---|---|---|---|---|
| 24 | Cellulose Nitrate | $^3H$ | 57.5 | 20.8 |
| 25 | Cellulose Nitrate | $^{14}C$ | 46.1 | 38.5 |
| 26 | Butvar B-98 | $^3C$ | 40.1 | 14.5 |
| 27 | Butvar B-98 | $^{14}C$ | 41.0 | 34.2 |
| 28 | SR-82 | $^3H$ | 54.5 | 19.8 |
| 29 | SR-82 | $^{14}C$ | 44.2 | 36.9 |
| 30 | Arotap | $^3H$ | 75.3 | 27.3 |
| 31 | Arotap | $^{14}C$ | 60.1 | 50.2 |

EXAMPLES 32-33

To illustrate the effect of the fluor, the procedure in Examples 1 and 2 was repeated except that the p-quaterphenyl was replaced by p-terphenyl. The results appear in Table 6.

TABLE 6

| Example | Sample Isotope | Counting Efficiency % Relative | Absolute |
|---|---|---|---|
| 32 | $^3H$ | 74.4 | 27.0 |
| 33 | $^{14}C$ | 52.2 | 43.6 |

EXAMPLES 34-41

To further illustrate the effect of the binder, the procedure in Examples 32 and 33 was repeated except that the RP-1714 binder was replaced by cellulose nitrate, Butvar B-98, SR-82, and Arotap. The results appear in Table 7.

TABLE 7

| Example | Binder | Sample Isotope | Counting Efficiency % Relative | Absolute |
|---|---|---|---|---|
| 34 | Cellulose Nitrate | $^3H$ | 55.2 | 20.0 |
| 35 | Cellulose Nitrate | $^{14}C$ | 39.6 | 33.1 |
| 36 | Butvar B-98 | $^3H$ | 42.7 | 15.5 |
| 37 | Butvar B-98 | $^{14}C$ | 39.1 | 32.6 |
| 38 | SR-82 | $^3H$ | 53.7 | 19.5 |
| 39 | SR-82 | $^{14}C$ | 50.6 | 42.3 |
| 40 | Arotap | $^3H$ | 64.4 | 23.3 |
| 41 | Arotap | $^{14}C$ | 50.5 | 42.1 |

These demonstrate that, generally, more efficient results occur when using p-quaterphenyl as the primary fluor and RP-1714 as the binder.

EXAMPLES 42-49

Dried coatings of p-terphenyl and RP-1714, Butvar B-98 and cellulose nitrate prepared as in Examples 1-2 were overcoated with dispersions of 2,5-diphenyloxazole (hereinafter "PPO") in cyclohexane; "pyrylium I" in methanol; and sodium salicylate in water; and evaporated to dryness. Dried strips of the coatings were treated with $^3H$ in and $^{14}C$ in and counted in accord with the procedure outlined in Examples 1-2. The results appear in Table 8.

TABLE 8

| Example | Binder | Secondary Fluor | Sample Isotope | Counting Efficiency % Relative | Absolute |
|---|---|---|---|---|---|
| 42 | RP-1714 | PPO | $^3H$ | 62.8 | 22.8 |
| 43 | RP-1714 | PPO | $^{14}C$ | 56.7 | 47.4 |
| 44 | Butvar B-98 | Pyrylium I | $^3H$ | 42.3 | 15.3 |
| 45 | Butvar B-98 | Pyrylium I | $^{14}H$ | 38.4 | 32.0 |
| 46 | Butvar B-98 | Sodium Salicylate | $^3H$ | 44.1 | 16.0 |
| 47 | Butvar B-98 | Sodium Salicylate | $^{14}C$ | 58.6 | 48.9 |
| 48 | Cellulose Nitrate | Sodium Salicylate | $^3H$ | 57.0 | 20.6 |
| 49 | Cellulose Nitrate | Sodium Salicylate | $^{14}C$ | 54.6 | 45.6 |

EXAMPLES 50-57

The following examples were prepared and tested in accord with the above procedures. The binder in each example was cellulose nitrate. The results appear in Table 9.

TABLE 9

| Example | Fluor | Secondary Fluor | Sample Isotope | Counting Efficiency % Relative | Absolute |
|---|---|---|---|---|---|
| 50 | Anthracene | None | $^3H$ | 38.5 | 13.9 |
| 51 | Anthracene | None | $^{14}C$ | 35.7 | 29.8 |
| 52 | Anthracene | Pyrylium I | $^3H$ | 20.0 | 7.3 |
| 53 | Anthracene | Pyrylium I | $^{14}C$ | 23.7 | 19.8 |
| 54 | Anthracene | Sodium Salicylate | $^3H$ | .36.8 | 13.3 |
| 55 | Anthracene | Sodium Salicylate | $^{14}C$ | 35.2 | 29.4 |
| 56 | p-quater phenyl | Sodium Salicylate | $^3H$ | 56.5 | 20.5 |

TABLE 9-continued

| Example | Fluor | Secondary Fluor | Sample Isotope | Counting Efficiency % Relative | Absolute |
|---|---|---|---|---|---|
| 57 | p-quater phenyl | Sodium Salicylate | $^{14}C$ | 63.2 | 52.8 |

EXAMPLES 58–81

To illustrate the effect of the surfactant and corona discharge treatment, coatings prepared as in Examples 1–2, using larger particle size p-quaterphenyl crystals (maximum crystal size after coating and drying was about 10 μm) and except that the coatings were used after drying only overnight at room temperature rather than after complete drying, were imbibed in 0.2 percent solutions of various surfactants for 2 minutes, except that the DAXAD-30 solution was formulated at 0.125 percent. A control sample was dipped in cyclohexane for 30 seconds. Another control sample and a sample dipped in cyclohexane for 30 seconds were exposed to corona discharge (5 minutes exposure to an AC Corona-Cenco BD No. 10). For each sample two 5×1.3 cm strips were cut and each strip spotted with 10 μL of aqueous solutions buffered at PH 8.7, one of gentamicin sulfate $^3H$, the other of sucrose $^{14}C$. The radio-activities of the solutions at the time of spotting were 16,539 and 24,662 disintegrations/minute, respectively. The results are set forth in Table 10.

TABLE 10

| Example | Surfactant | Sample Isotope | Counting Efficiency % Relative | Absolute |
|---|---|---|---|---|
| 1″ | None | $^3H$ | 3.7 | 1.4 |
| 2″ | None | $^{14}C$ | 73.3 | 54.0 |
| 1‴ | Cyclohexane only | $^3H$ | 2.6 | 1.0 |
| 2‴ | Cyclohexane only | $^{14}C$ | 81.0 | 59.7 |
| 58 | Tamol | $^3H$ | 4.1 | 1.6 |
| 59 | Tamol | $^{14}C$ | 91.0 | 67.1 |
| 60 | Tamol + Cyclohexane | $^3H$ | 3.9 | 1.5 |
| 61 | Tamol + Cyclohexane | $^{14}C$ | 83.5 | 61.9 |
| 62 | DAXAD-30 | $^3H$ | 3.1 | 1.2 |
| 63 | DAXAD-30 | $^{14}C$ | 84.4 | 62.3 |
| 64 | DAXAD-30 + Cyclohexane | $^3H$ | 5.5 | 2.1 |
| 65 | DAXAD-30 + Cyclohexane | $^{14}C$ | 75.7 | 55.8 |
| 66 | Alkanol XC | $^3H$ | 52.7 | 20.2 |
| 67 | Alkanol XC | $^{14}C$ | 78.8 | 58.1 |
| 68 | Alkanol XC + Cyclohexane | $^3H$ | 42.9 | 15.9 |
| 69 | Alkanol XC + Cyclohexane | $^{14}C$ | 70.1 | 51.7 |
| 70 | Surfactant 10G | $^3H$ | 41.9 | 16.1 |
| 71 | Surfactant 10G | $^{14}C$ | 76.1 | 56.1 |
| 72 | Surfactant 10G + Cyclohexane | $^3H$ | 41.5 | 15.9 |
| 73 | Surfactant 10G + Cyclohexane | $^{14}C$ | 65.6 | 48.4 |
| 74 | Triton x-200 | $^3H$ | 38.6 | 14.9 |
| 75 | Triton x-200 | $^{14}C$ | 69.8 | 51.5 |
| 76 | Triton x-200 + Cyclohexane | $^3H$ | 39.8 | 15.3 |
| 77 | Triton x-200 Cyclohexane | $^{14}C$ | 74.9 | 55.3 |
| 78 | Corona | $^3H$ | 36.8 | 14.1 |

TABLE 10-continued

| Example | Surfactant | Sample Isotope | Counting Efficiency % Relative | Absolute |
|---|---|---|---|---|
| 79 | Discharge Corona Discharge | $^{14}C$ | 56.9 | 42.0 |
| 80 | Cyclohexane + Corona Discharge | $^3H$ | 43.7 | 16.8 |
| 81 | Cyclohexane + Corona Discharge | $^{14}C$ | 56.0 | 41.3 |

The results indicate that some surfactants are more effective for different labels than others. Film treatment by corona discharge was found to improve counting efficiencies. Further, films comprising the above-noted larger p-quaterphenyl crystals exhibited a lower overall efficiency than those smaller crystals used in Examples 1 and 2.

EXAMPLES 82–87

Dried coatings were prepared as in Examples 58–81, except for the variations in the weight ratios of fluor to binder noted below. The surfactant-treated samples were dipped for 2 minutes in a 0.2 percent solution of Triton X-100 surfactant. Samples were spotted with 10 L volumes of gentamicin sulfate $^3H$ in pH 8.7 buffer, sucrose $^{14}C$ in water and thyroxine $^{125}I$ in pH 8.7 buffer. The radio-activities at the time of spotting were respectively 16,539, 24,662 and 33,762 disintegrations/minute. The counting efficiencies were measured according to the above-described techniques. The results appear in Table 11.

TABLE 11

| Example | Surfactant | Sample Isotope | Fluor/Binder Ratio | Counting Efficiency % Relative | Absolute |
|---|---|---|---|---|---|
| 82 | None | $^3H$ | 6:1 | 3.7 | 1.5 |
| A | None | | 1:1 | 0.5 | 0.2 |
| 83 | None | $^{14}C$ | 6:1 | 74.1 | 56.9 |
| B | None | | 1:1 | 47.7 | 36.7 |
| 84 | None | $^{125}I$ | 6:1 | 18.0 | 8.1 |
| C | None | | 1:1 | 5.8 | 2.6 |
| 85 | Triton X-100 | $^3H$ | 6:1 | 54.6 | 22.1 |
| D | Triton X-100 | | 1:1 | 0.6 | 0.3 |
| 86 | Triton X-100 | $^{14}C$ | 6:1 | 78.8 | 60.5 |
| E | Triton X-100 | | 1:1 | 41.6 | 32.0 |
| 87 | Triton X-100 | $^{125}I$ | 6:1 | 38.3 | 17.2 |
| F | Triton X-100 | | 1:1 | 11.2 | 5.0 |

Controls A–F indicate the importance in having the weight ratio exceed 1:1 for maximized counting efficiencies.

EXAMPLES 88–99

To further illustrate the effect of the weight ratio of fluor to binder, a dispersion prepared according to Examples 58–81 was coated at wet thicknesses of 0.076, 0.152 and 0.229 mm, dried, dipped in a 0.2 percent aqueous Alkanol XC surfactant and dried. The test sample labels were $^3H$ theophylline, having a molecular weight of 180 and $^{14}C$ uric acid, having a molecular weight of 170. The solvent in both cases was water. The radioactivity of the solutions at the time of spotting was respectively 41,617 and 25,480 disintegrations/minute. The results appear in Table 12.

TABLE 12

| Example | Wet Coating Thickness (mm) | Fluor/Binder Weight Ratio | Relative Counting Efficiency % $^3$H | Relative Counting Efficiency % $^{14}$C |
|---|---|---|---|---|
| 88 | 0.076 | 6:1 | 60.1 | 75.3 |
| 89 | 0.152 | 6:1 | 65.3 | 80.6 |
| 90 | 0.229 | 6:1 | 63.8 | 79.8 |
| 91 | 0.076 | 6:1 | 66.3 | 77.3 |
| 92 | 0.152 | 6:1 | 68.4 | 85.5 |
| 93 | 0.229 | 6:1 | 66.9 | 82.2 |
| 94 | 0.076 | 6:1 | 67.8 | 73.2 |
| 95 | 0.152 | 6:1 | 73.1 | 87.4 |
| 96 | 0.229 | 6:1 | 68.5 | 82.9 |
| 97 | 0.076 | 2:1 | 18.6 | 48.1 |
| 98 | 0.152 | 2:1 | 19.5 | 64.2 |
| 99 | 0.229 | 2:1 | 18.2 | 66.1 |
| G(control) | 0.076 | 1:1 | 11.9 | 34.6 |
| H(control) | 0.152 | 1:1 | 6.7 | 49.2 |

EXAMPLES 100 and 101—Use of Non-Polar Solvents

A dispersion prepared according to Examples 1-2 was coated to a wet thickness of 0.152 mm and dried to a thickness of 0.0279 mm.

For the two examples two strips 5 cm by about 1.3 cm were cut and spotted with 10 μL $^3$H-oleic acid and 10 μL $^{14}$C-oleic acid in hexane. Each solution when spotted had respectively 40,443 and 13,785 disintegrations/minute. The strips were mounted in glass vials and counted in a Packard Tri-Carb Liquid Scintillation Counter Model 3003. The relative counts/minute of the samples were determined by the counts/minute of the solid scintillator divided by counts/minute found for the same radioactive dose diluted into 10 μL of Eastman Liquid Scintillation Cocktail "Ready to Use I". This ready to use cocktail is used for nonaqueous samples in liquid scintillation counting, having absolute counting efficiencies of about 32% for $^3$H and 82% for $^{14}$C in the spectrometer used. The results are summarized in Table 13.

TABLE 13

| Example | Sample Isotope | Film-Thickness (Dry) | Relative Efficiency |
|---|---|---|---|
| 100 | $^3$H | 0.0279 mm | 99% |
| 101 | $^{14}$C | 0.0279 mm | 74% |

The data of examples 100 and 101 show that the nonaqueous p-quaterphenyl scintillator film can be used effectively with nonpolar solvents such as hexane.

The invention has been described in detail with particular reference to certain preferred embodiments thereof, but it will be understood that variations and modifications can be effected within the spirit and scope of the invention.

What is claimed is:

1. A dry particulate scintillator counting composition for the detection of radiative substances in a liquid, comprising a mixture of fluor particles and a binder bonding said particles into a coherent structure, the weight amount of said fluor being sufficiently greater than the weight amount of said binder as to render said structure sufficiently porous between the disposed particles of fluor to provide transport of a saturating amount of liquid throughout at least 50% of the volume of the composition.

2. A composition as defined in claim 1, wherein said fluor and said binder are present in a volume ratio that is at least 2 to 1.

3. A composition as defined in claim 1, wherein said fluor is ionic whereby a nonpolar, organic solvent is useful in said liquid.

4. A composition as defined in claim 1, wherein said fluor is non-ionic whereby an aqueous solvent is useful in said liquid.

5. A composition as defined in claim 1 further comprising a secondary fluor.

6. A dry element for the detection of radiative substances in a liquid, comprising:
   a support,
   and a layer on the support comprising a mixture of fluor particles and a binder bonding said particles into a coherent structure, the weight amount of said fluor being sufficiently greater than the weight amount of said binder as to render said structure sufficiently porous between the disposed particles of fluor to provide transport of a saturating amount of liquid throughout at least 50% of the volume of the composition.

7. An element as defined in claim 6 wherein said fluor and said binder are present in a volume ratio that is at least 2 to 1.

8. An element as defined in claim 6 wherein said fluor is ionic so as to be substantially insoluble in nonpolar organic solvents.

9. An element as defined in claim 6 wherein said fluor is non-ionic so as to be substantially insoluble in aqueous liquids.

10. An element as defined in claim 6 further comprising a secondary fluor.

11. A method of detecting radiative substances in a nonaqueous liquid, comprising the steps of
   (a) applying the liquid to a dry scintillator counting composition comprising a mixture of fluor particles and a binder bonding said particles into a coherent structure, the weight amount of said fluor being sufficiently greater than the weight amount of said binder as to render said structure sufficiently porous between the disposed particles of fluor to provide transport of a saturating amount of liquid throughout at least 50% of the volume of the composition, so that said liquid permeates through said pores to bring said substances into intimate contact with said particles; and
   (b) counting the emissions of the fluor caused by said radiative substances.

12. A method as defined in claim 11 wherein the liquid is applied to two of said dry structures, and said counting step is accomplished while said structures are disposed together in a face-to-face relationship.

* * * * *